United States Patent
Shori et al.

(10) Patent No.: US 6,779,414 B2
(45) Date of Patent: Aug. 24, 2004

(54) INSPECTION METHOD OF CONTINUOUSLY VARIABLE TRANSMISSION BELT

(75) Inventors: Kaoru Shori, Shizuoka (JP); Hiroaki Kuroda, Shizuoka (JP); Eiichiro Muramatsu, Shizuoka (JP)

(73) Assignee: Jatco Ltd. (JP)

(*) Notice: Subject to any disclaimer, the term of this patent is extended or adjusted under 35 U.S.C. 154(b) by 0 days.

(21) Appl. No.: 10/448,084

(22) Filed: May 30, 2003

(65) Prior Publication Data

US 2003/0233895 A1 Dec. 25, 2003

(30) Foreign Application Priority Data

Jun. 3, 2002 (JP) ........................................ 2002-162025

(51) Int. Cl.$^7$ .............................................. G01N 19/00
(52) U.S. Cl. ...................... 73/865.9; 198/804; 198/833
(58) Field of Search .................. 73/865.9; 198/804, 198/833; 474/12

(56) References Cited

U.S. PATENT DOCUMENTS

2003/0168317 A1 * 9/2003 Fromme et al. ......... 198/502.1

FOREIGN PATENT DOCUMENTS

| JP | 2000240729 A | * | 9/2000 | ........ F16G/01/00 |
| JP | 2001-021007 | | 1/2001 | |
| JP | 2001-146943 | | 5/2001 | |
| JP | 2001-232306 | | 8/2001 | |

* cited by examiner

*Primary Examiner*—Hezron Williams
*Assistant Examiner*—Rodney T. Frank
(74) *Attorney, Agent, or Firm*—Blank Rome LLP

(57) ABSTRACT

An inspection method is provided which can achieve sufficient reliability of a continuously variable transmission belt without spending much working time. The inspection method of the continuously variable transmission belt assembled through supporting an element laminated body constituted of a number of metal elements on a belt laminated body constituted of a plurality of steel belts comprises: a trial step of trial use with a load applied on the continuously variable transmission belt in the assembled state; a separation step of separating the belt laminated body and the element laminated body from each other after completion of the trial step; and an inspection step of inspecting whether there is any damage on a surface of the steel belt positioned in a first layer of the belt laminated body separated in the separation step.

4 Claims, 5 Drawing Sheets

PRIOR ART

PRIOR ART

INSPECTION METHOD OF CONTINUOUSLY VARIABLE TRANSMISSION BELT

BACKGROUND OF THE INVENTION

The present invention relates to an inspection method of a continuously variable transmission belt which is laid on a driving pulley and a driven pulley of a continuously variable transmission, and controls the diameter ratio of these two pulleys in order to change continuously the transmission gear ratio of a vehicle such as an automobile. More specifically, the invention relates to an inspection method of a continuously variable transmission belt which is assembled through the process of laminating a number of metal elements punched into predetermined shapes, and supported by laminated body thereof on a metal endless belt (hereinafter referred to as "steel belt").

FIGS. 4A and 4B show the appearance of a continuously variable transmission belt. In the drawings, a continuously variable transmission belt 1 is assembled to form an assembly by supporting an element laminated body 3 constituted of a number of (e.g., about 400) metal elements 3a on two runs of belt laminated body 2 consisting of a plurality of (e.g., 12) steel belts 2a.

The metal element 3a is a steel block (small metal piece) formed in a predetermined shape by a metal punching plate process. For example, it is formed in a shape which brings to mind the upper half image of a human body, i.e., a shape which has a "head part 3b", a "breast part 3c" and a "neck part 3d" interconnected by the head part 3b and the breast part 3c.

A projection 3e is formed on one surface (front surface of the drawing) of the head part 3b, and a recess (not shown) is formed on the other surface (backside of the drawing). Projections 3e and recesses of adjacent metal elements 3a are fitted together to align the metal elements 3a with each other.

Two runs of belt laminated body 2 are fitted into recess 3f formed between the head part 3b and the breast part 3c of the metal element 3a. Here, the number of laminations is set for the belt laminated body 2 so that when the space between the head part 3b and the breast part 3c (spacing width of the recess 3f) is "L", the lamination thickness D of the belt laminated body 2 becomes a value approximately equal to or slightly smaller than L.

As shown in FIG. 5, the continuously variable transmission belt 1 which has the aforementioned constitution is laid on a driving pulley 4 (driving side pulley or input side pulley) and a driven pulley 5 (driven side pulley or output side pulley) of a continuously variable transmission to be used. The continuously variable transmission continuously changes the transmission gear ratio of a vehicle such as an automobile by controlling the diameter ratio of the two pulleys 4, 5. That is, the speed is reduced when the relation between the diameter of the driving pulley 4 (one curvature Ri of the continuously variable transmission belt 1) and the diameter of the driven pulley 5 (other curvature Ro of the continuously variable transmission belt 1) is set to "Ri<Ro", the speed is increased at "Ri>Ro", and the speed becomes constant at "Ri=Ro".

Incidentally, the continuously variable transmission belt 1 is an important transmission component for conveying the driving force of a vehicle, such as an automobile, to the drive train. Especially, in a vehicle installed with a high powered engine, since a considerably large force is applied to the continuously variable transmission belt 1, sufficient consideration must be given to the durability of the continuously variable transmission belt 1.

Thus, Japanese laid-open (Kokai) patent application number (A) 2001-21007 titled "BELT FOR CONTINUOUSLY VARIABLE TRANSMISSION" indicates a technical problem that friction and the pressing force generated between the metal element 3a and the steel element 2a during transmission of the driving force shorten the fatigue life of the steel belt 2a, adversely affecting the durability of the continuously variable transmission belt 1, and discloses that in order to solve the problem, it is effective to devise a shape of the prescribed component of the metal element 3a (see saddle part 3g of FIG. 2A) which contacts with the steel belt 2a.

However, the technology disclosed in the aforementioned publication is applied only when the metal element 3a is being fabricated. Thus, even if an ideal machining shape can be designed, it is only a paper plan. In an actually manufactured component (metal element 3a), abnormal shaped portions ("flashes", "burrs", "chips", "swells", etc.) undeniably occur due to a punching error or the like. Even if precision punching work such as fine blanking process is carried out, since it is difficult to completely eliminate the abnormal shaped portions, for example, some remnants adhere to the punching "die", and these remnants may form very small abnormal shaped portions on the peripheral part of the machined component (metal element 3a).

Although such abnormal shaped portions can be reduced to a negligible level, for example barrel processing, this requires so many man-hours to the point it causes a new inconvenience.

SUMMARY OF THE INVENTION

Therefore, it is an object of the present invention to provide an inspection method which can achieve sufficient reliability of a continuously variable transmission belt without spending much working time.

In accordance with the present invention, there is provided an inspection method of a continuously variable transmission belt assembled through supporting the element laminated body constituted of a number of metal elements on belt laminated bodies constituted of a plurality of steel belts, wherein the inspection method comprises: a trial step in which an continuously variable transmission belt in assembled state is tried with load applied; a separation step in which the belt laminated body and the element laminated body are separated from each other after completion of the trial step; and an inspection step in which the steel belt positioned in the first layer of the belt laminated body separated in the separation step is inspected whether there is any damage on the surface thereof.

According to the invention, the belt laminated body is separated from the continuously variable transmission belt after the trial use is carried out with the load applied, and an inspection is carried out as to whether there is any damage on the surface of the steel belt positioned in the first layer of the belt laminated body.

Thus, if a metal element which includes an abnormal shaped portion (see element 3i in FIG. 2(a)) is mixed in the metal elements constituting the element laminated body, and if the abnormal shaped portion is not negligible because it adversely affects durability of the continuously variable transmission belt, damage (or scar) highly probably occurs on the surface of the steel belt positioned in the first layer of the belt laminated body. Accordingly, by monitoring to find the damage (or scar), a defective continuously variable transmission belt can be identified before it is mounted to the continuously variable transmission, whereby only a good continuously variable transmission belt can be mounted to the continuously variable transmission. As a result, a process which requires much working time such as barrel processing can be eliminated or even when the process is simplified, occurrence of problems in the continuously variable transmission can be prevented to achieve sufficient reliability.

In accordance with the preferred mode of the present invention, the inspection step is carried out as to detect whether there is any damage on the surface of the steel belt by an image recognition technology or other nondestructive inspection technologies.

In this case, as the other nondestructive inspection technologies, there are magnetic particle inspection, liquid penetrant inspection, eddy current inspection, radiographic inspection, ultrasonic inspection, probe surface inspection, and so on.

In the trial step, the trial use is carried out by laying the continuously variable transmission belt of the assembled state on a driving pulley and a driven pulley of the continuously variable transmission or two pulleys similar to the two pulleys, and applying a driving force on one pulley and a load on the other pulley. When the trial use is carried out, the diameter of either the pulley with the driving force applied or the pulley with the load applied is reduced.

The load in the trial step is a load close to a real use environment of the continuously variable transmission belt or a load imitating the real use environment.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

Figure 1:
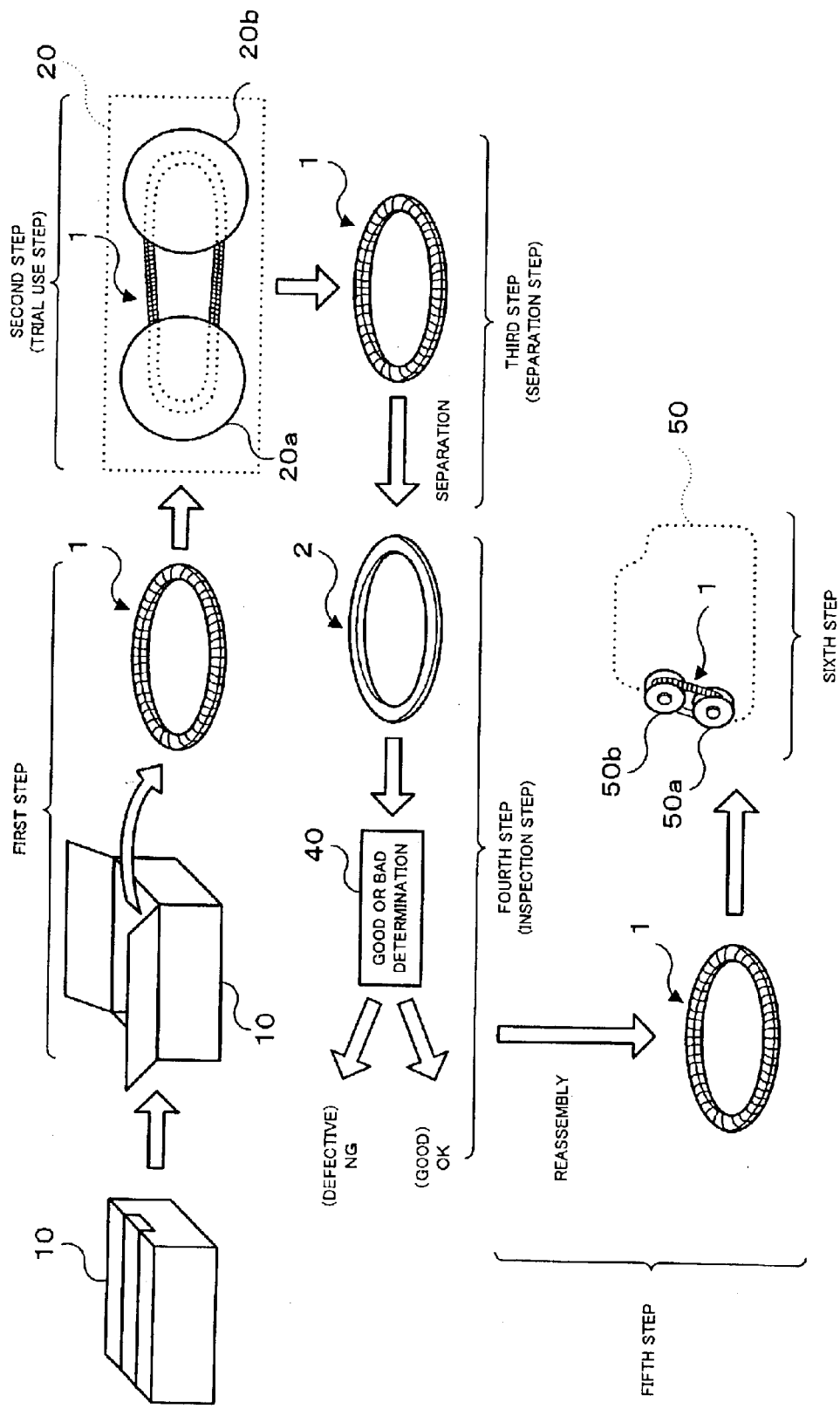
FIG. 1 is a conceptual process chart of an embodiment.
Figure 4A:
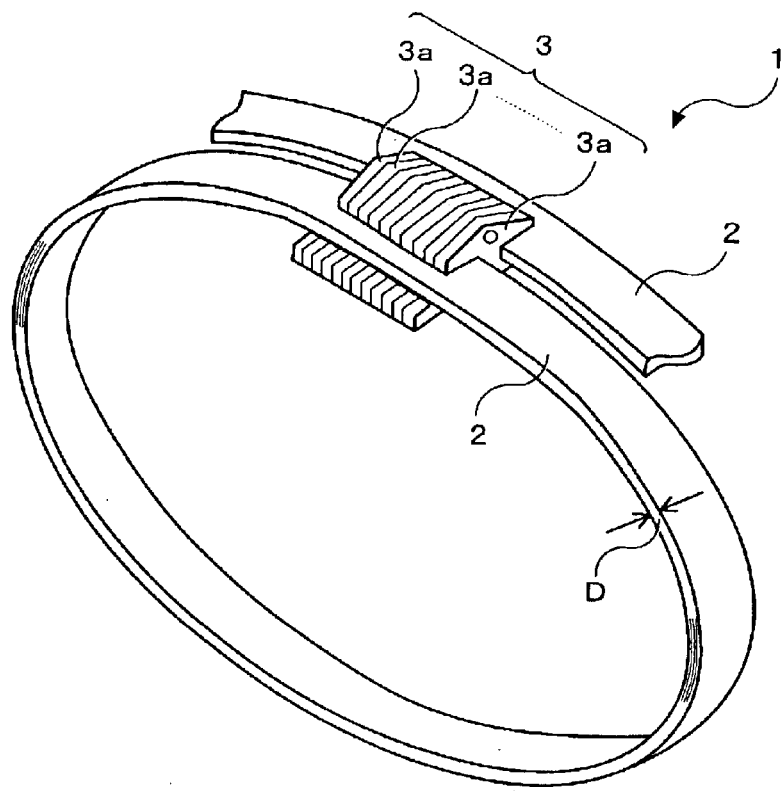
FIGS. 4A and 4B are appearance views of the continuously variable transmission belt 1.
Figure 4B:
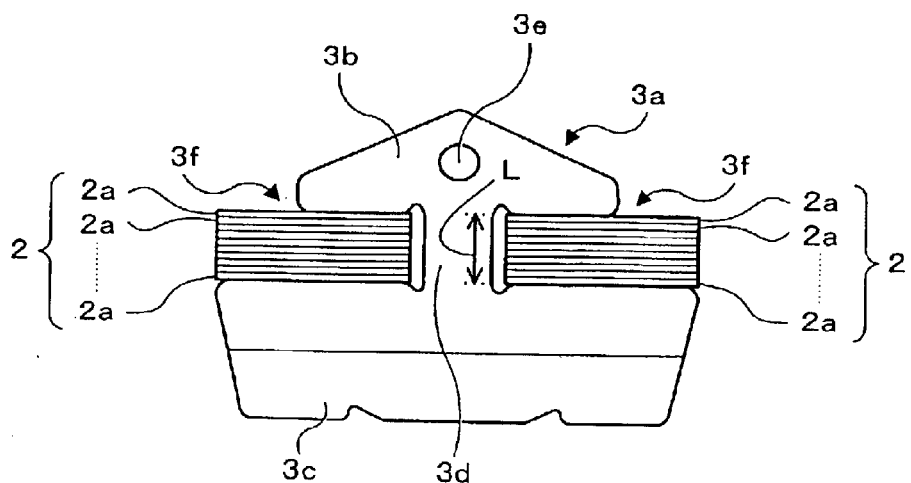
Figure 5:
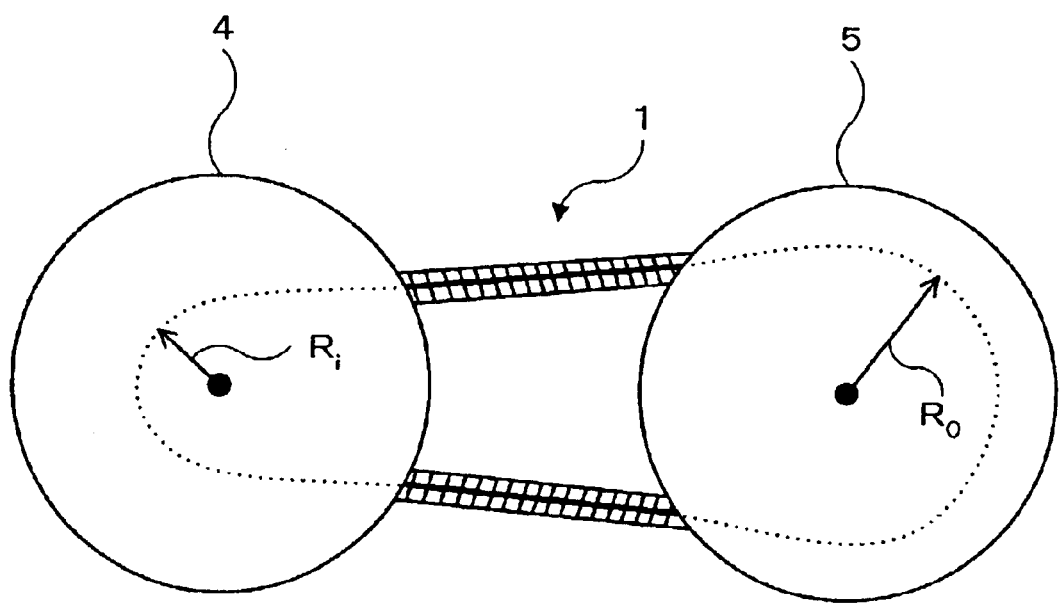
FIG. 5 is a use state view of the continuously variable transmission belt 1.

FIG. 1 is a conceptual process chart of an "inspection method of a continuously variable transmission belt" according to an embodiment. As described above with reference to FIGS. 4A and 4B, a continuously variable transmission belt 1 is assembled through supporting an element laminated body 3 constituted of a number of (e.g., about 400) metal elements 3a on two belt laminated bodies 2 each of which is constituted of a plurality (e.g., about 12) of steel belts 2a, and fed to the inspection process in the assembled state.

Figure 2A:
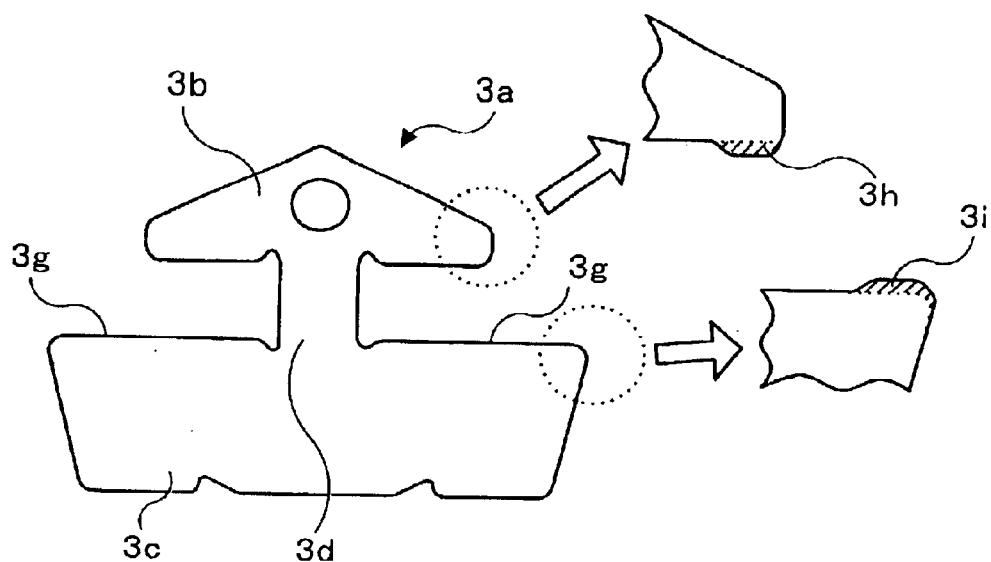
FIGS. 2A and 2B are an appearance view of a metal element 3a, an enlarged view of an example of its abnormal shaped portion, and a partially enlarged view of a continuously variable transmission belt 1.

FIG. 2A is a view showing an example of an abnormal shaped portion of the metal element 3a. In the drawings, a hatching portion 3h of a head part 3b of the metal element 3a and hatching portion 3i of a saddle part 3g show representatively abnormal shaped portions. If these hatching portions (hereinafter referred to as "abnormal shaped portions") 3h, 3i are very small "swells", it is the abnormal shaped portion 3i positioned in the saddle part 3g that is likely to adversely affect durability of the metal element 3a.

Figure 2B:
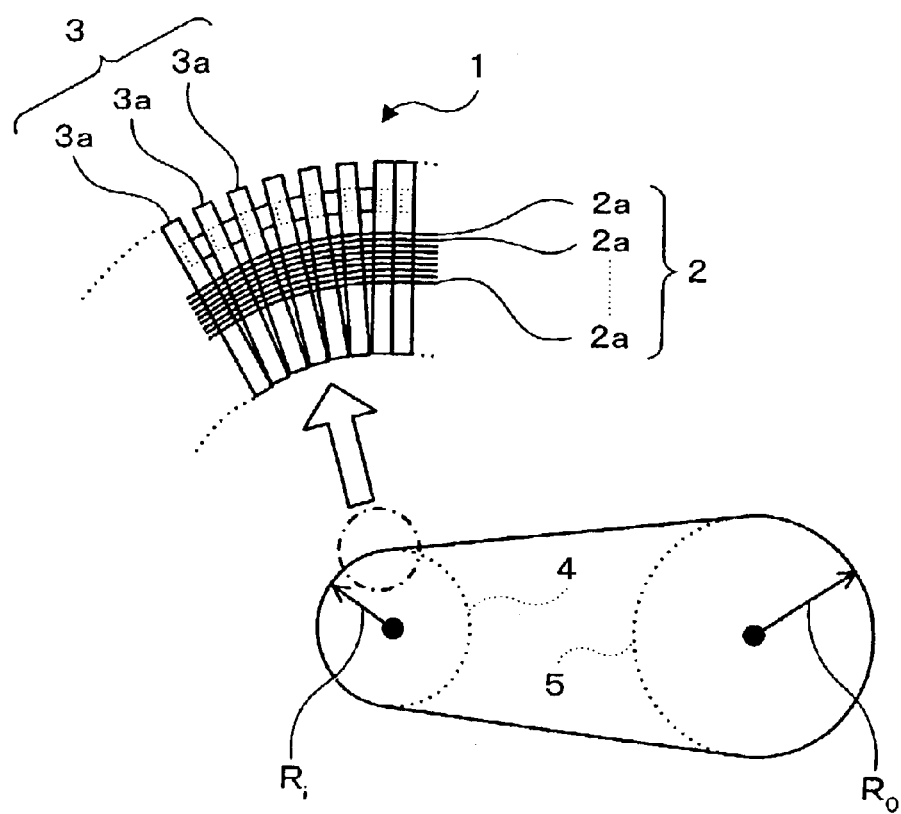

A reason is that as shown in FIG. 2B, when the continuously variable transmission belt 1 is laid on a driving pulley 4 and a driven pulley 5 and the driven pulley 5 is driven by the driving pulley 4, tensility of the belt laminated body 2 toward the ring inner side becomes larger as the diameter of the driving pulley 4 (curvature Ri of the continuously variable transmission belt 1) becomes smaller, and thus the belt laminated body 2 is pressed to the saddle part 3g by a stronger force. In the following steps, among the abnormal shaped portions formed in the metal element 3a, especially the abnormal shaped portion 3i positioned in the saddle part 3g which may potentially affect adversely the durability of the metal element 3a, is inspected if it exists or not.

(First Step)

A box 10 of FIG. 1 indicates a package of the continuously variable transmission belt 1. In the "inspection method of the continuously variable transmission belt" of the embodiment, first, the continuously variable transmission belt 1 is taken out from the box 10. However, this is just an example and, needless to say, other reception methods may be used.

(Second Step: Equivalent to Trial Step)

Then, after execution of required appearance inspection (inspection of appearance abnormality or the like), the continuously variable transmission belt 1 is laid on a driving pulley 20a and a driven pulley 20b of a trial device 20, and trial use (trial running) is carried out under required conditions.

Figure 3A:
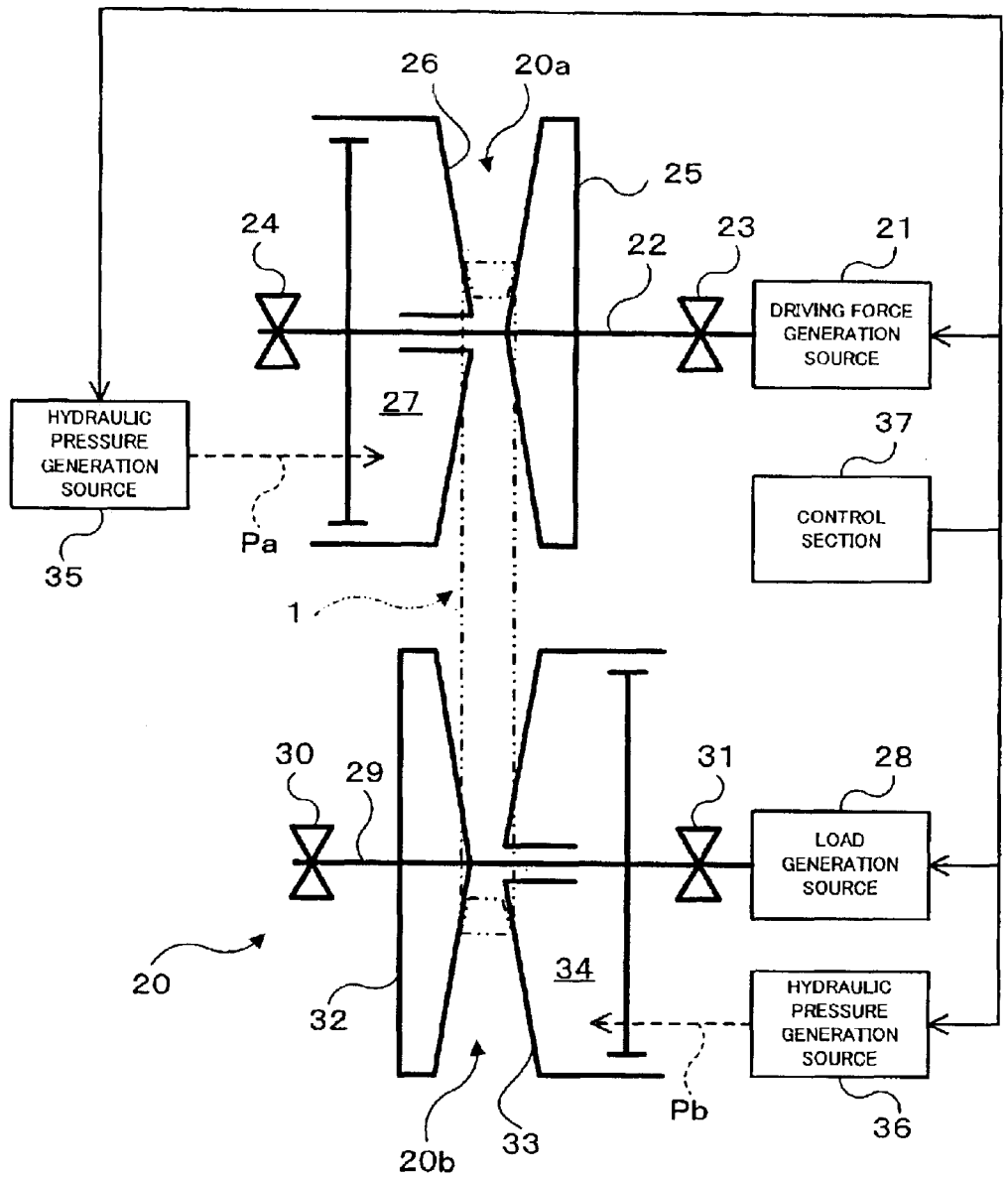
FIGS. 3A and 3B are views schematically showing a structure of a trial device 20.

FIG. 3A shows a schematic structure of the trial device 20. In the drawing, the driving pulley 20a comprises a drive shaft 22 connected to a rotary shaft of a driving force generation source 21 (electric motor in the drawing), bearings 23, 24 for rotatably holding both ends of the drive shaft 22, a fixed side pulley half 25 secured to the drive shaft 22, and a movable side pulley half 26 arranged on the drive shaft 22 so as to be connectable to the fixed side pulley half 25. The movable side pulley half 26 is pressed toward the fixed side pulley half 25 by the hydraulic pressure Pa applied in an oil chamber 27. The movable side pulley half 26 is also called a movable sheave.

The driven pulley 20b comprises a driven shaft 29 arranged in parallel with the drive shaft 22 at a predetermined space, and connected to a rotary shaft of a load generation source 28 (regenerative braking equipment using an electric motor in the drawing), bearings 30, 31 for rotatably holding both ends of the driven shaft 29, a fixed side pulley half 32 secured to the driven shaft 29, and a movable side pulley half 33 arranged on the driven shaft 29 so as to be connectable to the fixed side pulley half 32. The movable side pulley half 33 is pressed toward the fixed side pulley half 32 by a hydraulic pressure Pb applied in an oil chamber 34. The movable side pulley half 33 is also called a movable sheave.

Furthermore, the trial device 20 comprises hydraulic pressure generation sources 35, 36 for generating the hydraulic pressures Pa, Pb, and a control section 37 for controlling operations of the driving force generation source 21, the load generation source 28, and the hydraulic pressure generation sources 35, 36.

According to the trial device 20 having such a constitution, the hydraulic pressures Pa, Pb are controlled while the continuously variable transmission belt 1 is laid on the driving pulley 20a and the driven pulley 20b, whereby both or one of the movable side pulley halves 26, 33 of the driving pulley 20a and the driven pulley 20b is pressed toward the fixed side pulley halves 25, 32. Thus, diameters of the driving pulley 20a and the driven pulley 20b (curvatures Ri, Ro of the continuously variable transmission belt 1) can be freely set to a desired relation (Ri<Ro, Ri>Ro, or Ri=Ro).

Then, the trial device 20 sets a load force of the load generation source 28 to a desired value after the setting of the curvatures Ri, Ro of the continuously variable transmission belt 1 to the desired relation, sets a driving force of the driving force generation source 21 to a desired value, and starts trial use of the continuously variable transmission belt 1. Here, the curvatures Ri, Ro in the trial use is preferably set to a relation where one of Ri and Ro is smaller (i.e., Ri<Ro, or Ri>Ro). It is because when the continuously variable transmission belt 1 is actually used in the continuously variable transmission, a high load state occurs during acceleration or deceleration. In this respect (high load state during actual use), more preferably, a specific target of the aforementioned relation (Ri<Ro, or Ri>Ro) is set to a relation used at the time of starting or backing during the actual use. It is because the largest load is generated at the time of starting or backing.

A load force of the load generation source 28 is properly set by considering a traveling load during normal traveling, a traveling load at the time of starting or backing, etc. A driving force of the driving force generation source 21 is properly set by considering an engine output during the actual use. Trial use duration time of the continuously variable transmission belt 1 may be preset predetermined time or may be set by trial and error based on a test result.

As described above, the trial device 20 of the embodiment enables trial use of the continuously variable transmission belt 1 with a load applied preferably enables trial use with a load imitating the real use environment of the continuously variable transmission belt 1.

As the load imitating the real use environment, for example, a variable load may be used which is based on an irregular traveling mode such as 10-mode fuel consumption test. It is possible to carry out trial use closer to the real use environment.

(Third Step: Equivalent to Separation Step)

After the execution of the trial use, the belt laminated body 2 is removed from the continuously variable transmission belt 1. This removal may be carried out mechanically by a special fixture or manually.

(Fourth Step: Equivalent to Inspection Step)

In this step, appearance inspection is carried out as to the belt laminated body 2 removed from the continuously variable transmission belt 1. Specifically, surface inspection is carried out for one sheet of steel belt 2a in contact with the saddle part 3g (see FIG. 2A) of the metal element 3a among the plurality of steel belts 2a constituting the belt laminated body 2, i.e., the steel belt 2a positioned in the first layer of the belt laminated body 2.

This inspection may be carried out visually. However, from man power saving view point, preferably, an inspection technology such as an image recognition technology is used. For example, an image of the surface of the steel belt 2a is picked up, and a peculiar portion in the picked-up image may be detected as damage (or scar). Alternatively, a non-destructive inspection technology such as magnetic particle inspection, liquid penetrant inspection, eddy current inspection, radiographic inspection, ultrasonic inspection, or probe surface inspection may be used. In the drawings, a good or bad determining device 40 uses such an inspection method.

Figure 3B:
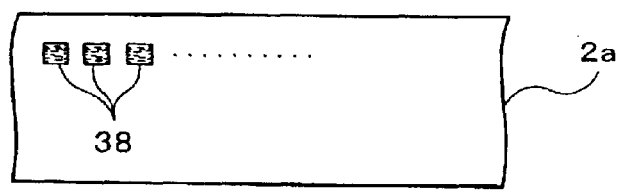

FIG. 3B is a partial plan view showing a partial surface of the steel belt 2a. In the drawing, the surface of the steel belt 2a (surface abutted on the saddle part 3g) normally maintains substantially uniform gloss. In the shown example, different gloss portions 38 from the surroundings (hereinafter referred to as "peculiar gloss portions") are formed in dotted manner. A result of close observation by the inventors verifies that these peculiar gloss portions 38 are traces (damage or scars) of partial scraping-off of the surface of the steel belt 2a. It is also verified that such damage (or scar) is one of the causes of the shortened fatigue life of the steel belt 2a during actual use.

In the fourth step, if damage on the surface of the steel belt 2a (surface abutted on the saddle part 3g) is discovered, the damage may possibly be generated by friction with the saddle part 3g of the metal element as a result of the trial use in the second step. Thus, in this case, there is an undesirable possibility that for example, the abnormal shaped portion 3i shown in FIG. 2A may be left in the saddle part 3g of the metal element 3a. If left as it is, such a portion can deteriorate the durability of the continuously variable transmission belt 1 during the actual use, accordingly, that continuously variable transmission belt 1 itself which is inspected is removed as a defective one (NG).

(Fifth Step)

A good continuously variable transmission belt 1 where no damage of the steel belt 2a is found in the third step is assembled (the belt laminated body 2 and the element laminated body 3 are assembled) to form an assembly again.

(Sixth Step)

The continuously variable transmission belt 1 reassembled through the aforementioned steps is laid on a driving pulley 50a and a driven pulley 50b of a continuously variable transmission 50 as desired to complete all the steps of the embodiment. The last step (sixth step) may be omitted. This is because it is only necessary to provide a high-quality continuously variable transmission belt 1 having no potential risk of durability deterioration during the actual use to following manufacturing processes (manufacturing processes of the continuously variable transmission), regardless whether the following manufacturing processes are in own company or in other company.

As apparent from the foregoing, according to the embodiment, the following advantages can be obtained.

(1) If an assembled product (continuously variable transmission belt 1) which includes a metal element 3a having an abnormal shaped portion 3i similar to that shown in FIG. 2A is received, the abnormal shaped portion is discovered, which enables to remove the product as a defective one (NG), and only a good (OK) continuously variable transmission belt 1 can be passed to the following manufacturing processes (manufacturing processes of the continuously variable transmission). Accordingly, only the good continuously variable transmission belt 1 can be mounted to the continuously variable transmission 50 and, as a result, occurrence of problems in the continuously variable transmission 50 can be prevented to achieve sufficient reliability.

(2) Moreover, the advantage of (1) can become conspicuous when the belt is applied to the continuously variable transmission 50 compatible to a high powered engine. It is because the high powered engine applies a large load to the continuously variable transmission belt 1, and accordingly shortening of the fatigue life of the steel belt 2a caused by the aforementioned abnormal shaped portion is considered to be significant.

According to the invention, the belt laminated body is separated from the continuously variable transmission belt after the trial use is carried out with a load applied, and the inspection is carried out as to whether there is any damage on the surface of the steel belt positioned in the first layer of the belt laminated body.

Thus, if a metal element which includes an abnormal shaped portion (see element 3i in FIG. 2A) is mixed in the metal elements constituting the element laminated body, and if the abnormal shaped portion is not negligible because it adversely affects the durability of the continuously variable transmission belt, damage (or scar) highly probably occurs on the surface of the steel belt positioned in the first layer of the belt laminated body. Accordingly, by discovering the damage (or scar), a defective continuously variable transmission belt can be found before it is mounted to the continuously variable transmission, whereby only a good continuously variable transmission belt can be mounted to the continuously variable transmission. As a result, a process which requires much working time such as barrel finishing can be eliminated. Even when the process is simplified, occurrence of problems in the continuously variable transmission can be prevented to achieve sufficient reliability.

In accordance with the preferred mode of the present invention, without any manual work, the inspection can be carried out as to whether there is any damage on the surface of the steel belt by the image recognition technology or the other nondestructive inspection technologies. Thus, labor can be saved.

When the trial use is carried out, the diameter of either the pulley with the driving force applied or the pulley with the load applied is reduced to enable enlargement of friction and a pressing force between the steel belt and the metal element. If there is abnormal shaped portion left in the metal element, the steel belt is easily damaged to increase inspection efficiency.

The load in the trial step is a load close to a real use environment of the continuously variable transmission belt or a load imitating the real use environment. Accordingly, the inspection can be carried out in an environment closer to a reality, and inspection accuracy can be improved.

While the present invention has been described with reference to the preferred embodiments thereof, the invention is not to be limited to the details given therein.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An inspection method of a continuously variable transmission belt assembled through supporting an element laminated body constituted of a number of metal elements on a belt laminated body constituted of a plurality of steel belts, comprising the steps of:

a trial step of using said continuously variable transmission belt in assembled state for trial with a load applied thereon;

a separation step of separating said belt laminated body and said element laminated body from each other after completion of said trial step; and an inspection step of inspecting whether there is any damage on a surface of said steel belt positioned in a first layer of said belt laminated body separated in said separation step.

2. Said inspection method of said continuously variable transmission belt as set forth in claim 1, wherein in said inspection step, an inspection is carried out as to whether there is any damage on a surface of said steel belt by an image recognition technology or other nondestructive inspection technologies.

3. Said inspection method of said continuously variable transmission belt as set forth in claim 1, wherein in said trial step, a trial use is carried out having said continuously variable transmission belt in assembled state laid on a driving pulley and a driven pulley of said continuously variable transmission or on two pulleys similar to the two pulleys, and applying a driving force on one pulley and applying a load on the other pulley, and when said trial use is carried out, the diameter of either said pulley with said driving force applied or said pulley with said load applied is reduced.

4. Said inspection method of said continuously variable transmission belt as set forth in claim 1, wherein the load in said trial step is a load close to a real use environment of said continuously variable transmission belt or a load imitating a real use environment.

* * * * *